United States Patent [19]

Thomas et al.

[11] Patent Number: 5,334,849

[45] Date of Patent: Aug. 2, 1994

[54] APPARATUS FOR AND METHOD OF VERIFYING ETCHING OF OPTICAL SERVO INFORMATION ON MAGNETIC MEDIA

[75] Inventors: Fred C. Thomas, Kaysville; James Bero; Robert Short, both of Ogden; Paul R. Johnson, South Kaysville, all of Utah

[73] Assignee: Iomega Corporation, Roy, Utah

[21] Appl. No.: 896,197

[22] Filed: Jun. 10, 1992

[51] Int. Cl.$^5$ .................. G01D 5/34; G11B 13/04
[52] U.S. Cl. .................. 250/559; 250/571; 356/445; 369/13
[58] Field of Search ............ 250/571, 572, 559, 562; 356/445, 446, 447, 448; 369/13, 59

[56] References Cited

U.S. PATENT DOCUMENTS

| | | | |
|---|---|---|---|
| 4,633,451 | 12/1986 | Ahn et al. | 369/14 |
| 4,831,470 | 5/1989 | Brunnett et al. | 360/75 |
| 4,935,835 | 6/1990 | Godwin et al. | 360/135 |
| 4,961,123 | 10/1990 | Williams et al. | 360/131 |
| 4,985,880 | 1/1991 | Yoshida et al. | 369/13 |
| 5,020,040 | 5/1991 | Lee | 369/13 |
| 5,067,039 | 11/1991 | Godwin et al. | 360/135 |
| 5,107,107 | 4/1992 | Osborne | 250/231.14 |
| 5,204,847 | 4/1993 | Tayefeh | 369/13 |

OTHER PUBLICATIONS

Y. Y. Fan and V. M. Huynh, "Investigation of Light Scattering From Rough Periodic Surfaces-Numbered Solutions", Dept. of Mech. Eng. Univ. of Windsor, Ontario, Mar. 1992.

J. Mazumder, "Overview of Melt Dyanmics in Laser Processing", Optical Engin. vol. 30, No. 8, pp. 1208-1219 Aug. 1991.

M. W. Sasnett and T. F. Johnston, Jr., "Beam Characterization and Measurement of Propagation Attributes", Laser Beam Diagnostics, SPIE vol. 1414, Los Angeles 1991.

F. Jorgensen, "The Complete Handbook of Magnetic Recording" 3rd Edition, TAB Books, Inc.., Blue Ridge Summit, Pa. 1988 pp. 119-121.

"An Introduction to the Insite 325 Floptical® Disk Drive", Godwin, J., *SPIE Optical Data Storage Topical Meeting* vol. 1078, pp. 71-79, (1989).

"Optoelectronics—An Introduction", Wilson, J., Hawkes, J. F. B., School of Physics, Newcastle upon Tyne Polytechnic, *Prentice/Hall International.*

Primary Examiner—David C. Nelms
Assistant Examiner—John R. Lee
Attorney, Agent, or Firm—Woodcock Washburn Kurtz Mackiewicz & Norris

[57] ABSTRACT

An apparatus and method for etching a point on the surface of a magnetic medium to reduce the reflectivity of the point and for verifying that proper etching occurred. A light source provides a collimated incident beam of light. The incident beam is focused to a point on the medium and a portion of the beam is reflected. The reflected beam is separated from the incident beam and the intensity of the reflected beam is measured. The measured intensity is compared to a threshold value and verification is indicated if the measured intensity exceeds the threshold value.

44 Claims, 4 Drawing Sheets

APPARATUS FOR AND METHOD OF VERIFYING ETCHING OF OPTICAL SERVO INFORMATION ON MAGNETIC MEDIA

FIELD OF THE INVENTION

This invention relates generally to information storage media having magnetic data tracks and optical servo tracks, and more particularly, the present invention relates to an apparatus for and method of etching the optical servo tracks onto the magnetic medium and for verifying the etching of the optical servo tracks.

BACKGROUND OF THE INVENTION

So-called "floppy" disk memory systems for "desk top" sized computers are well known in the art. Such systems employ magnetic storage disks having a diameter of either 5.25 inches or 3.50 inches. Conventional magnetic storage disks for floppy disk drives have a track density ranging from forty-eight (48) to one hundred thirty-five (135) tracks per inch (TPI). In contrast, optical storage disks for optical memory systems achieve track densities greater than 15,000 TPI. The greater track density of optical disks is achieved by the use of optical servos that maintain fine positioning of the optical read/write head over the data tracks on the disk. Typically, concentric optical servo tracks are pre-recorded on the optical disk to guide the servo mechanism.

New advances in barium-ferrite magnetic media have allowed bit densities of magnetic storage disks to exceed the bit densities of optical disks. However, as mentioned above, track densities of magnetic media (48–135 TPI) are many times less than their optical counterparts. This limits the overall capacity of magnetic disks as compared to optical disks. Conventional magnetic disk systems employ a magnetic servo mechanism and magnetically pre-recorded servo tracks on the disks to guide the read/write head. Magnetic servo systems cannot provide the fine positioning that optical servo systems can provide.

Recently, floppy disk systems have been developed that combine magnetic disk recording techniques with the high track capacity optical servos found in optical disk systems. Such a system is described in AN INTRODUCTION TO THE INSITE 325 FLOPTICAL(R) DISK DRIVE, Godwin, in a paper presented at the SPIE Optical Data Storage Topical Meeting (1989). Essentially, an optical servo pattern is pre-recorded on a magnetic floppy disk. The optical servo pattern typically consists of a large number of equally spaced concentric tracks about the rotational axis of the disk. Data is stored in the magnetic "tracks" between the optical servo tracks using conventional magnetic recording techniques. An optical servo mechanism is provided to guide the magnetic read/write head accurately over the data between the optical servo tracks. By utilizing optical servo techniques, much higher track densities are achievable on the relatively inexpensive removable magnetic medium.

As mentioned, the optical servo pattern typically consists of a large number of equally spaced concentric tracks about the rotational axis of the disk. As disclosed in U.S. Pat. No. 4,961,123, each track may be a single continuous groove (FIG. 3), a plurality of equally spaced circular pits (FIG. 8), or a plurality of short equally spaced grooves or stitches (FIG. 9). Various methods and systems exist for inscribing the optical servo tracks on the magnetic medium.

For example, U.S. Pat. No. 5,067,039, entitled "High Track Density Magnetic Media with Pitted Optical Servo Tracks and Method for Stamping the Tracks on the Media," discloses a method for "stamping" the servo tracks on the magnetic medium. Essentially a master stamping disk is produced bearing a template of the optical servo pattern. This master disk is then pressed against the magnetic floppy disk under a pressure of several tons per square inch. The significant amount of pressure transfers the servo track pattern from the master disk to the floppy.

U.S. Pat. No. 4,633,451, entitled "Optical Servo for Magnetic Disks," discloses a method of providing optical servo information on a magnetic medium consisting of a multi-layer film. The optical servo tracks are formed on the multi-layer film by laser heating the structure to cause a reaction or interdiffusion to occur between layers. The reaction produces a reflectivity contrast of about eight percent (8%) between exposed and unexposed areas. Other methods for preparing the servo tracks are mentioned including contact printing, embossing, and lithography.

U.S. Pat. No. 4,961,123, entitled "Magnetic Information Media Storage with Optical Servo Tracks," discloses a preferable method and apparatus for etching the pattern on a disk using a focused beam of light. The magnetic disk is placed on a platen/spindle assembly and rotated. A beam of light is focused to a small spot on the spinning disk. The focussed beam has sufficient intensity to ablate the disk surface at the point of incidence, thereby reducing the reflectivity of the surface at that point. The beam can be left on during an entire revolution to produce a continuous groove or can be modulated on and off through one revolution to produce a stitched pattern. This method has several advantages. First, the intensity of the focussed beam of light can be adjusted for different types of magnetic media. Secondly, different stitched patterns can be etched simply by varying the on-off time of the beam or by varying the speed of rotation of the disk. Additionally, there is no need to produce a master disk, as with the stamping method.

As mentioned above, the optical servo pattern often comprises a number of equally spaced concentric optical servo tracks about the rotational axis of the disk. A single disk may have as many as 900 concentric servo tracks. Additionally, each optical servo track may be a continuous groove, or alternatively, may comprise a plurality of equally spaced stitches. When a stitched pattern is employed, the number of stitches in each optical servo track may exceed 1600 with each track having the same number of stitches. It is crucial for proper servo positioning that every stitch be sufficiently detectable by the servo optics. As mentioned, a preferred method of producing a stitched pattern is by focusing a beam of light on a rotating disk and modulating the beam on and off. The beam, when incident upon the surface of the disk and properly focused, has sufficient intensity to etch the surface thereby creating a stitch having reduced reflectivity.

It is possible, for a number of reasons, that one or more stitches are not properly etched. For example, the optics of the etching apparatus may become misaligned, dust particles may interfere with the incident beam of light, or the incident beam may not be properly focused upon the medium. It is critical for proper servo positioning that every stitch in each optical servo track be properly etched; one missing etch will ruin the entire disk. Thus, there exists a need for an apparatus and method for etching the surface of a magnetic medium and for verifying that proper etching occurred. The present invention satisfies this need.

Additionally, the width of the etched stitches is on the order of microns and must be maintained within tight tolerances. Stitch width can be affected by improper focussing of the incident beam. Thus, there also exists a need for an apparatus and method for imaging the etched spot on the surface of the medium and determining the size of the etched spot from the image in order to ascertain whether focus adjustment is necessary. The present invention satisfies this need as well.

It is also desirable to provide a method for aligning the incident beam to the center of rotation of the spindle in order to ensure accurately known radii of the servo tracks and to maintain accurate angular positioning of the stitches relative to a fixed angular index from the outer track to inner track. Such a method is further provided in accordance with the present invention.

SUMMARY OF THE INVENTION

The present invention comprises an apparatus for etching a point on the surface of a magnetic medium to reduce the reflectivity of that point and for verifying that etching occurred. The apparatus comprises a light source for providing a collimated incident beam of light. A first lens situated in the path of the transmitted incident beam focuses the incident beam to a point on the surface of the magnetic medium. The focused incident beam reacts with the magnetic medium to reduce the reflectivity of the surface at that point. A portion of the focused incident beam is reflected, and the first lens collimates the reflected beam and directs the reflected beam back toward the light source. The apparatus further comprises means for separating the reflected beam from the incident beam and for deflecting the reflected beam. Detector means situated in the path of the deflected reflected beam measure the intensity of the reflected beam and compare the measured intensity to a threshold value. Proper etching is verified if the intensity of the reflected beam is not less than the threshold value.

According to a preferred embodiment of the present invention, the detector means comprises a second lens situated in the path of the deflected reflected beam. An opaque screen is positioned substantially in the focal plane of the second lens. The screen has a pin hole substantially at the focal point of the second lens and operates to block out un-focused rays of light emanating from the second lens. A photodetector is positioned on the side of the screen opposite the second lens and proximate the pin hole for producing a signal having a magnitude proportional to the intensity of the deflected reflected beam passing through the pin hole. In the preferred embodiment, the apparatus further comprises means for adjustably attenuating the reflected beam for protecting the photodetector from damage due to the intensity of the reflected beam during etching and for allowing the same photodetector to be used with various incident beam and reflected beam intensities.

Additionally, according to the preferred embodiment of the present invention, the means for separating and for deflecting the reflected beam comprises a polarizer positioned in the path of the incident beam between the light source and the first lens for linearly polarizing the incident beam in a first polarizing direction. A beam separator is positioned in the path of the incident beam between the polarizer and the first lens having means for transmitting light linearly polarized in the first polarizing direction and for deflecting light linearly polarized in a direction orthogonal to the first polarizing direction. Accordingly, the beam separator transmits the incident beam. Means positioned between the first lens and the beam separator alter the polarization of the reflected beam relative to the incident beam such that the reflected beam is linearly polarized in a direction orthogonal to the direction of polarization of the incident beam thereby causing the beam separator to deflect the reflected beam.

Preferably, the magnetic medium is positioned in the focal plane of the first lens. Additionally, the threshold value is adjustable for different types of magnetic media.

In the preferred embodiment of the present invention, the magnetic medium is a disc having a rotational axis and having concentric magnetic data tracks about the rotational axis. According to this preferred embodiment, the apparatus further comprises means for rotating the disc about its rotational axis, and means for modulating the light source on and off for consecutively etching a plurality of equally spaced stitches about the rotational axis of the medium. The means for rotating the disk comprises a spindle/platen assembly. The plurality of stitches define an optical servo track. The detector means is employed to verify each consecutively etched stitch in the track. The apparatus further comprises means for positioning the incident beam radially of the disc for etching each of a plurality of concentric optical servo tracks about the rotational axis of the disc.

According to another feature of the present invention, each optical servo track has a pre-determined stitch count and the apparatus further comprises a counter and means for incrementing the counter each time a stitch is verified. Means are also provided for comparing the contents of the counter to the pre-determined stitch count. Proper etching of each optical servo track is verified when the contents of the counter equal the pre-determined stitch count for that track.

According to yet another feature of the present invention, the apparatus further comprises imaging means positioned in the path of the deflected reflected beam for generating from the reflected beam an image of the etched point on the surface of the medium. Means for processing the generated image to determine the size of the etched point are provided along with means for adjusting the focus of the first lens if the size of the etched point exceeds a pre-determined tolerance.

According to still another aspect of the present invention, the incident beam is aligned to the center of rotation of the spindle prior to etching the servo tracks.

Other features of the present invention will become evident from the following drawings and specification.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings, an embodiment that is preferred, it being understood, however, that the invention is not limited to the specific methods and instrumentalities disclosed. In the drawings.

DETAILED DESCRIPTION OF THE PREFERRED EMBODIMENT

Figure 1:
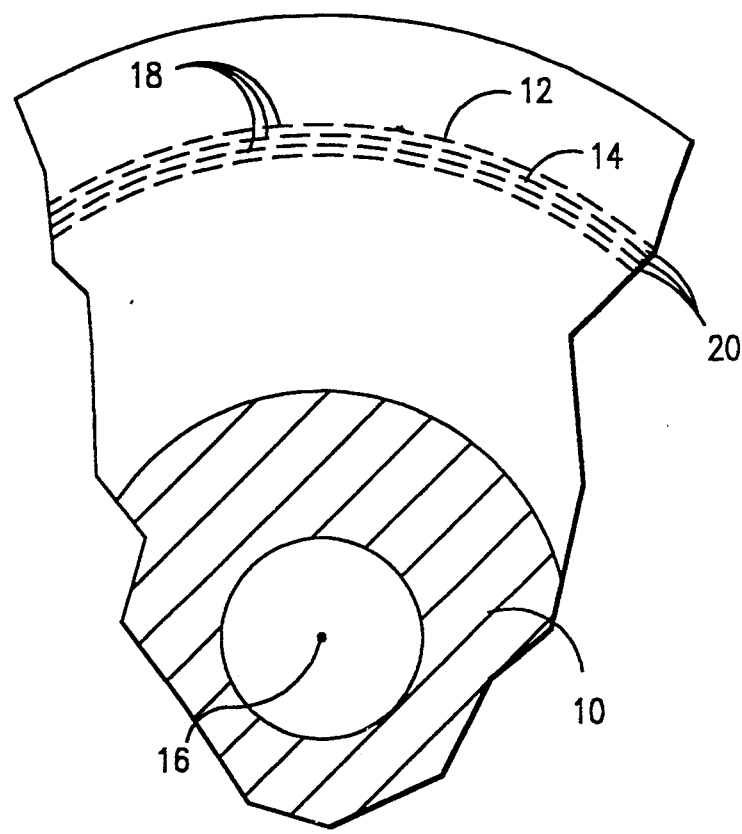
FIG. 1 is a top view of a portion of a magnetic disk having concentric optical servo tracks each comprised of a plurality of equally spaced etched stitches.

Referring to the drawings in detail, wherein like numerals indicate like elements throughout, there is shown in FIG. 1 a top view of a portion of a magnetic disk 10 having concentric optical servo tracks 12, 14 about the rotational axis 16 of the disk 10. Each servo track 12, 14 is comprised of a plurality of equally spaced etched stitches 18. Concentric magnetic data tracks 20 lie between each adjacent pair of servo tracks 12, 14 for magnetically recording data on the disk 10. In the preferred embodiment, each disk has 900 concentric servo tracks and each servo track comprises 1666 equally spaced etched stitches. Each stitch is approximately 4.8 microns wide and the spacing between adjacent stitches in a same track is 20.4 microns. Since the inner radius of the disk is smaller than the outer radius, the length of the stitches in a given servo track increases from the inner to outer radius of the disk in order to maintain the same number of stitches in each track.

Figure 2:
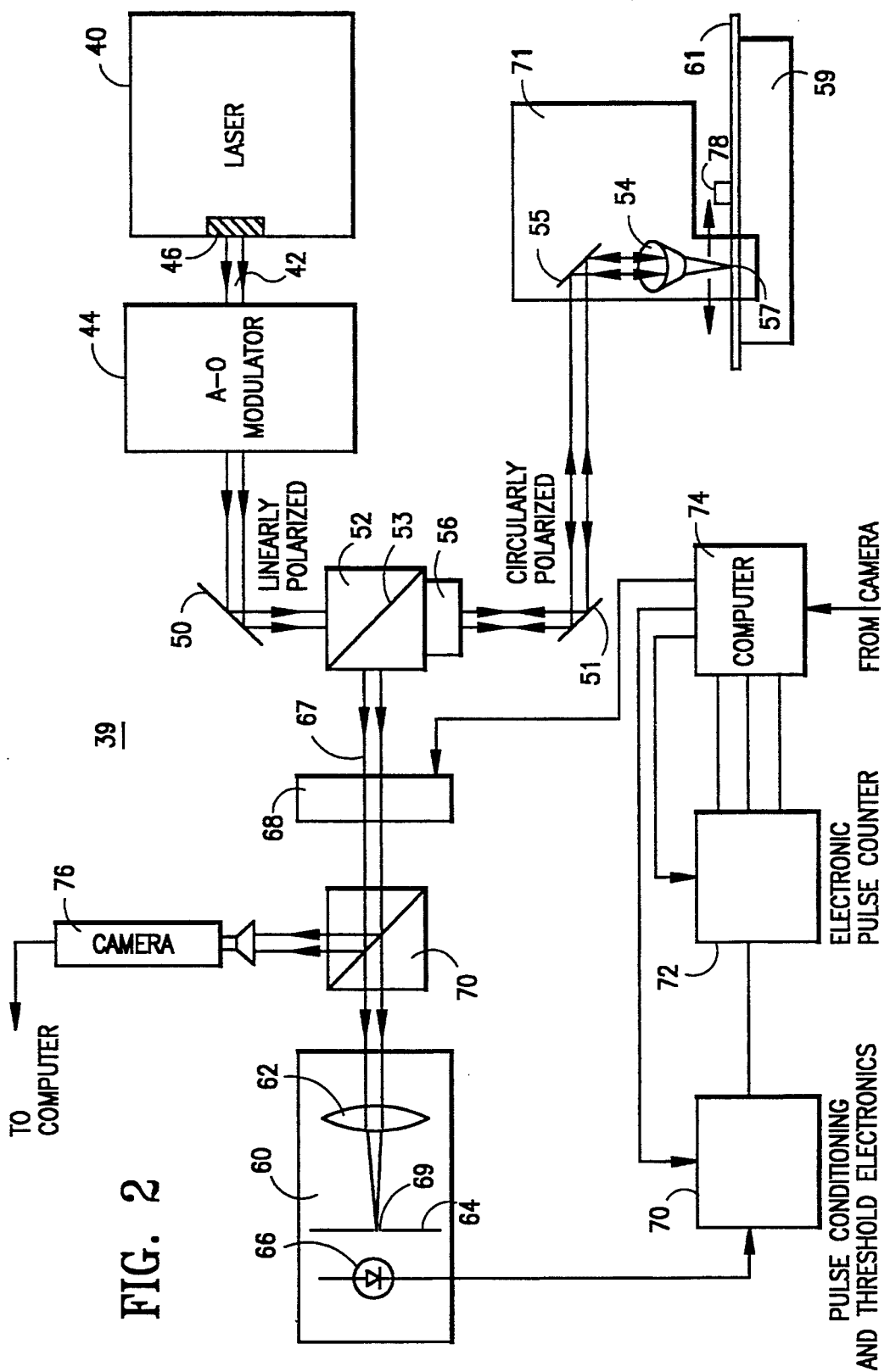
FIG. 2 is a block diagram of an apparatus for etching optical servo information on a magnetic medium, for verifying said etching, and for imaging the etched spot on the surface of the medium in accordance with the present invention.

Referring to FIG. 2, there is shown a preferred embodiment of an apparatus 39 for etching a point on the surface of a magnetic medium to reduce the reflectivity of the point and for verifying that proper etching of the point occurred. More particularly, the apparatus 39 is for etching a plurality of concentric optical servo tracks about the rotational axis of a magnetic storage disc, such as is shown in FIG. 1, wherein each track comprises a plurality of equally spaced etched stitches, and for verifying the stitch count of each track.

As shown in FIG. 2, the apparatus 39 comprises a light source 40 for providing a collimated incident beam of light 42. A polarizer 46 is positioned in the path of the incident beam for linearly polarizing the incident beam of light in a first polarizing direction. The direction of linear polarization, i.e., the first polarizing direction, is not critical. In the preferred embodiment, the light source 40 is a laser tuned to a wavelength suitable for etching the surface of the magnetic medium. Thus, the incident beam is highly collimated and monochromatic. Different wavelengths may be used with magnetic media having different characteristics. In the preferred embodiment, the polarizer 46 for linearly polarizing the incident beam comprises two brewster windows in the laser tube.

The apparatus 39 also comprises means for modulating the light source 40 on and off for consecutively etching the plurality of equally spaced stitches in each optical servo track. In the preferred embodiment, the means for modulating the light source on and off is an acousto-optical device 44. Acousto-optic modulators are described in Wilson & Hawkes, OPTOELECTRONICS: AN INTRODUCTION, pp. 111 to 116 (Prentice/Hall 1983). Although an acousto-optical device is employed in the preferred embodiment, any other suitable means for modulating the light source on and off may be employed, such as for example, a shutter mechanism (not shown) or beam deflector (not shown). Alternatively, the power input to the light source itself could be modulated on and off to produce a corresponding modulation of the incident beam.

Mirror 50 directs the linearly polarized incident beam through a beam separator 52. Beam separator 52 of the present invention has means for transmitting light linearly polarized in the first polarizing direction (as is the incident beam) and for deflecting light linearly polarized in a direction orthogonal to the first polarizing direction. In the preferred embodiment, the means for transmitting light linearly polarized in the first polarizing direction and for deflecting light polarized orthogonal thereto is a multilayer dielectric thin film laser line coating 53 positioned along the hypotenuse of the beam separator 52.

The beam separator 52 transmits the linearly polarized incident beam and mirrors 51, 55 direct the transmitted incident beam to a first lens 54. The first lens 54 focuses the incident beam to a point 57 on a magnetic storage disk 61 to be etched. A platen/spindle assembly 59 rotates the disk 61 about its rotational axis. The spindle 59 has a center pin 78 at the center of rotation of the spindle 59. The disk 61 has a center hub (not shown) which has a center hole (not shown). The disk 61 is placed on the spindle 59 with the center pin 78 through the center hole (not shown) of the disk hub (not shown). The first lens 54 is positioned such that the rotating disc lies substantially in the focal plane of the first lens 54. The focused incident beam reacts with the rotating magnetic medium 61 at the point 57 to create a stitch (not shown) on the medium 61 having reduced reflectivity. A portion of the focused incident beam is reflected. Since the incident beam is focused to a fine point on the magnetic medium, the reflected light effectively emanates from a point source. As described above, the rotating disk 61 lies in the focal plane of the lens 54, and therefore this point source of reflected light lies at the focal point of the first lens 54. Consequently, the lens 54 operates to collimate the reflected light and direct a reflected beam back toward the beam separator 52 via the mirrors 51, 55.

The apparatus 39 further comprises means for altering the polarization of the reflected beam relative to the incident beam prior to the reflected beam passing back through the beam separator 52 such that the reflected beam is linearly polarized in a direction orthogonal to the first polarizing direction of the incident beam. In the preferred embodiment, the means for altering the polarization of the reflected beam relative to the incident beam is a quarter-wave plate 56. Essentially, as the linearly polarized incident beam (polarized in the first polarizing direction) first passes from the mirror 50 through the beam separator 52 and then through the quarter-wave plate 56, the quarter-wave plate 56 transforms the incident beam from linear polarization in the first polarizing direction to circular polarization. Thus, when the incident beam strikes the magnetic medium 61 at the point 57, it is circularly polarized. Consequently, the reflected beam that is directed by the first lens 54 back toward the quarter-wave plate 56 and beam separator 52 is similarly circularly polarized. As the circularly polarized reflected beam passes back through the quarter-wave plate 56, the quarter-wave plate 56 transforms the circularly polarized reflected beam to linear polarization. However, the transformed reflected beam will be linearly polarized in a direction orthogonal to the first polarizing direction of the incident beam. Consequently, as mentioned above, the thin film laser line coating 53 along the hypotenuse of the beam separator 52 will deflect the reflected beam (the deflected reflected beam is indicated generally at 67).

The polarizer 46, beam separator 52 and quarter waveplate 56 collectively comprise means for separating the reflected beam from the incident beam and for deflecting the reflected beam. It is understood by those skilled in the art that means other than those disclosed herein may be employed to separate and deflect the reflected beam. As used in the claims, the phrase "means for separating the reflected beam from the incident beam and for deflecting the reflected beam" is intended to encompass all such possibilities.

Referring still to FIG. 2, the apparatus 39 further comprises detector means 60 situated in the path of the deflected reflected beam for measuring the intensity of the reflected beam, and for comparing the measured intensity to a threshold value. Verification of proper etching is established if the measured intensity of the reflected beam is not less than the threshold value. As those skilled in the art know, many different compositions may be used for magnetic storage media. Different types of magnetic media may be more or less susceptible to etching at a given incident beam intensity than others. Accordingly, in the preferred embodiment, the threshold value is adjustable for different types of magnetic media.

In the preferred embodiment, the detector means 60 comprises a second lens 62, an opaque screen 64 and a photodetector 66, all situated in the path of the deflected reflected beam. The screen 64 is positioned substantially in the focal plane of the second lens 62 and has a pin hole 69 located at the focal point of the second lens 62. The photodetector is positioned on the side of the screen 64 opposite the lens The lens 62 focuses the deflected reflected beam onto the photodetector 66 which produces a signal having a magnitude proportional to the intensity of the reflected beam. For a single etch, the signal produced by the photodetector 66 is in the form of an electronic pulse. The opaque screen 64 blocks out any unfocused rays of light.

The apparatus 39 further comprises means for adjustably attenuating the reflected beam for protecting the photodetector 66 from damage due to the intensity of the reflected beam during etching and for allowing the same photodetector 66 to be used with various incident beam and reflected beam intensities. In the preferred embodiment, the means for attenuating the reflected beam is a standard optical beam attenuator 68 situated in the path of the deflected reflected beam between the beam separator 52 and the second lens 62. The degree of attenuation may be automatically adjusted by a computer 74 coupled to the attenuator 68.

The photodetector 66 is coupled to pulse conditioning and threshold circuitry 70 for comparing the magnitude of the pulse to the threshold value. The threshold circuitry 70 provides an indication of verification when the pulse amplitude exceeds the threshold. As those skilled in the art will appreciate, pulse conditioning and threshold circuitry 70 of the type employed herein are well known to those skilled in the art and may be implemented in many ways. Without deviating from the spirit and scope of the present invention, the threshold circuitry 70 of the present invention is not limited to any one implementation.

Although the apparatus 39 and method described herein may be employed to verify any etched pattern, the apparatus 39 is preferably employed to etch and verify an optical servo pattern such as that shown in FIG. 1. As described above, the servo pattern shown in FIG. 1 comprises a plurality of equally spaced concentric optical servo tracks about the rotational axis of the disk. In the preferred embodiment, each disk has 900 concentric servo tracks and each servo track comprises 1666 equally spaced etched stitches. Referring to FIG. 2, the apparatus 39 further comprises means (shown generally at 71) for moving the incident beam radially of the disc for etching each of the plurality of concentric tracks. Thus, the beam is moved radially of the disk during the etching process as indicated by the arrows in FIG. 2. A preferred method of moving the beam radially of the disk is disclosed in co-pending U.S. patent application Ser. No. 896,188, now U.S. Pat. No. 5,283,773, entitled "Steering Laser Beam While Etching Optical Servo Tracks for Magnetic Disks".

As mentioned previously, in addition to verifying that a single etch occurred, the apparatus 39 may be employed to verify the stitch count of each optical servo track. To this end, the apparatus 39 further comprises a counter 72 coupled to the threshold electronics 70 for incrementing the counter 72 each time a stitch is verified (i.e., when the measured intensity of the reflected beam for that stitch exceeds the threshold value). In the preferred embodiment, a computer 74 is coupled to the counter 72 for comparing the contents of the counter 72 to an expected, pre-determined stitch count after each track is etched. The counter 72 is reset to zero before etching each track.

Alternatively, rather than verifying the stitch count of each track, the apparatus 39 may be employed to verify the total stitch count for the entire disk. For this operation, the counter 72 would only be reset prior to etching the first track of each disk.

In use, the light source 40 provides a collimated incident beam of light that passes through modulator 44 which modulates the incident beam on an off at a rate sufficient to achieve the desired stitch count as the magnetic disk 61 rotates on the platen/spindle assembly 59. The incident beam is linearly polarized in the first polarizing direction. The linearly polarized beam then passes through the beam separator 52 and through the quarter wave plate 56, the latter transforming the linearly polarized incident beam to circular polarization. The circularly polarized incident beam is then focused to a point 57 on the rotating magnetic medium 61 by the first lens 54. As the beam modulates on and off, it reacts with the magnetic medium 61 as the medium 61 rotates past the point of incidence 57 of the beam thereby creating consecutive stitches having reduced reflectivity. The first lens 54 and mirror 55 are moved radially over the surface of the rotating medium 61 for etching each of the 900 concentric optical servo tracks.

As each stitch is etched, a portion of the incident beam is reflected by the magnetic medium. As previously described, the reflected light is collimated by the first lens 54 and directed back toward the quarter-wave plate 56. The reflected beam is circularly polarized prior to passing through the plate 56. As the reflected beam passes through the plate 56, the plate 56 transforms the beam from circular polarization to linear polarization. The direction of linear polarization of the reflected beam, however, will be orthogonal to the first polarizing direction of the incident beam. Consequently, the reflected beam is deflected as it passes through the beam separator 52 by the thin film laser line coating 53. The deflected reflected beam 67 is directed to the second lens 62 where it is focused through the pin-hole 69 in the opaque screen 64 and onto the photodetector 66. Essentially, first lens 54 and second lens 62 operate to image the etched point 57 onto the photodetector 66. As each stitch is etched, the photodetector 66 produces a pulse having an amplitude proportional to the intensity of the reflected beam for that stitch. The amplitude of the pulse is then compared to a threshold. The threshold is established such that if the amplitude of the pulse (i.e., the intensity of the reflected beam) equals or exceeds the threshold, then the incident beam had sufficient intensity to properly etch the stitch. Thus, in this manner, the apparatus 39 verifies the etching of each stitch. The counter 72 maintains a count of each pulse that satisfies the threshold. Each time the disk rotates through one revolution, the counter 72 is examined to ensure that the number of verified stitches equals the expected stitch count for the track. Thus, the present invention is directed to an apparatus and method for etching the surface of a magnetic medium and for verifying that etching occurred.

In accordance with another feature of the present invention, the apparatus 39 further comprises imaging means positioned in the path of the deflected reflected beam for generating from the reflected beam an image of the etched point 57 on the surface of the medium 61. In the preferred embodiment, the imaging means comprises a COD camera 76 having a long focal length lens such that the image of the etched point occupies a large portion of the camera's field-of-view. A standard beam splitter 70 is provided for splitting the deflected reflected beam so that both verification and imaging can be performed simultaneously. Although the preferred embodiment employs a CCD camera 76, any suitable imaging device may be employed without deviating from the spirit and scope of the present invention.

The camera 76 is coupled to the computer 74 which provides means for processing the generated image to determine the size of the etched point. The computer 74 may also provide means for processing the generated image to examine the energy profile of the focussed spot. The means for processing the generated image may comprise a standard frame-grabber add-in card (not shown) and associated image processing software (not shown); however, any suitable processing means may be employed without deviating from the spirit and scope of the present invention.

Recall from the background section that the width of the etched stitches is on the order of microns and must be maintained within tight tolerances. Often the culprit of excessive stitch width is an improperly focused incident beam. Accordingly, the apparatus 39 further comprises means (not shown) for adjusting the focus of the first lens 54 if the size of the etched point, as determined by the computer 74, exceeds a predetermined tolerance. The means for adjusting the focus of the first lens 54 may comprise a manual focusing mechanism (not shown) that an operator would adjust in response to an indication from the computer 74 that the size of the etched point 57 is too large. Alternatively, the computer 74 and accompanying hardware (not shown) may provide automatic adjustment of the focus of the first lens 54.

In accordance with yet another aspect of the present invention, the incident beam is aligned to the center of rotation of the spindle 59 prior to etching the servo tracks. Alignment is necessary to ensure accurately known radii of the servo tracks and to maintain accurate angular positioning of the stitches relative to a fixed angular index from the outer track to inner track.

Figure 3:
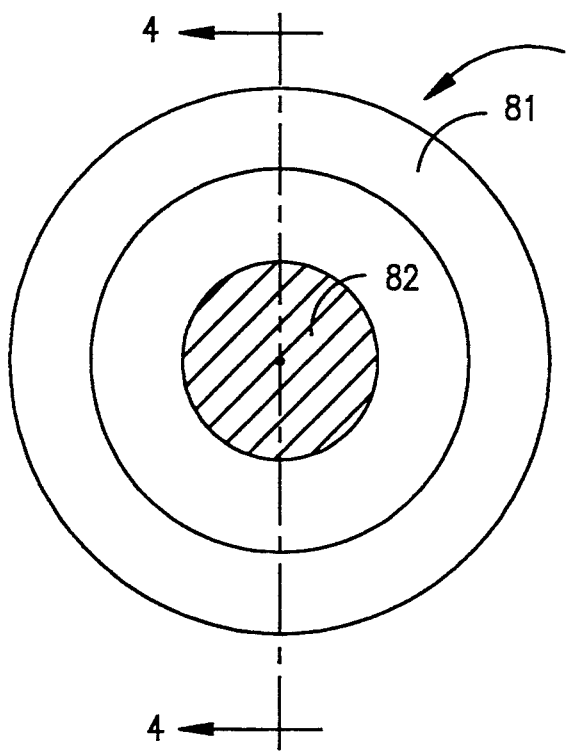
FIG. 3 is a top view of a centration device for aligning an incident beam.

FIG. 3 is a top view of a centration device 80 used to facilitate alignment of the incident beam with the center of rotation of the spindle 59. The centration device 80 comprises a base portion 81 and a finely ruled surface 82 secured to the top of the device 80. The finely ruled surface 82 may be a diffraction grating, a Ronchi ruling, or any other surface with closely spaced markings (i.e., less than 10 microns) that exhibit spatially repeating differences in optical contrast. In the preferred embodiment, the surface 82 has 3000 lines per inch scribed on it.

Figure 4:
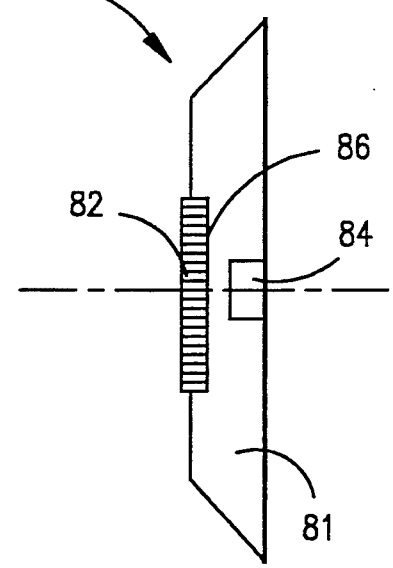
FIG. 4 is a cross-sectional view of the centration device of FIG. 3 taken along line 4—4 of FIG. 3.

FIG. 4 is a cross-sectional view of the centration device 80 taken along line 4—4 of FIG. 3. As shown, the device 80 further comprises a center hole 84 which engages with the center pin 78 of the spindle 59 for mounting the finely ruled surface 82 on the spindle 59 proximate the center of rotation. The ruled surface 82 is placed and secured in a milled portion 86 of the base 81. An alignment hole (not shown) may also be provided in the base 81 for engaging with an alignment pin (not shown) on the spindle. The alignment pin and corresponding alignment hole would operate to lock the device 80 in a fixed position during rotation so that the surface 82 does not move relative to the spindle 59.

Figure 5:
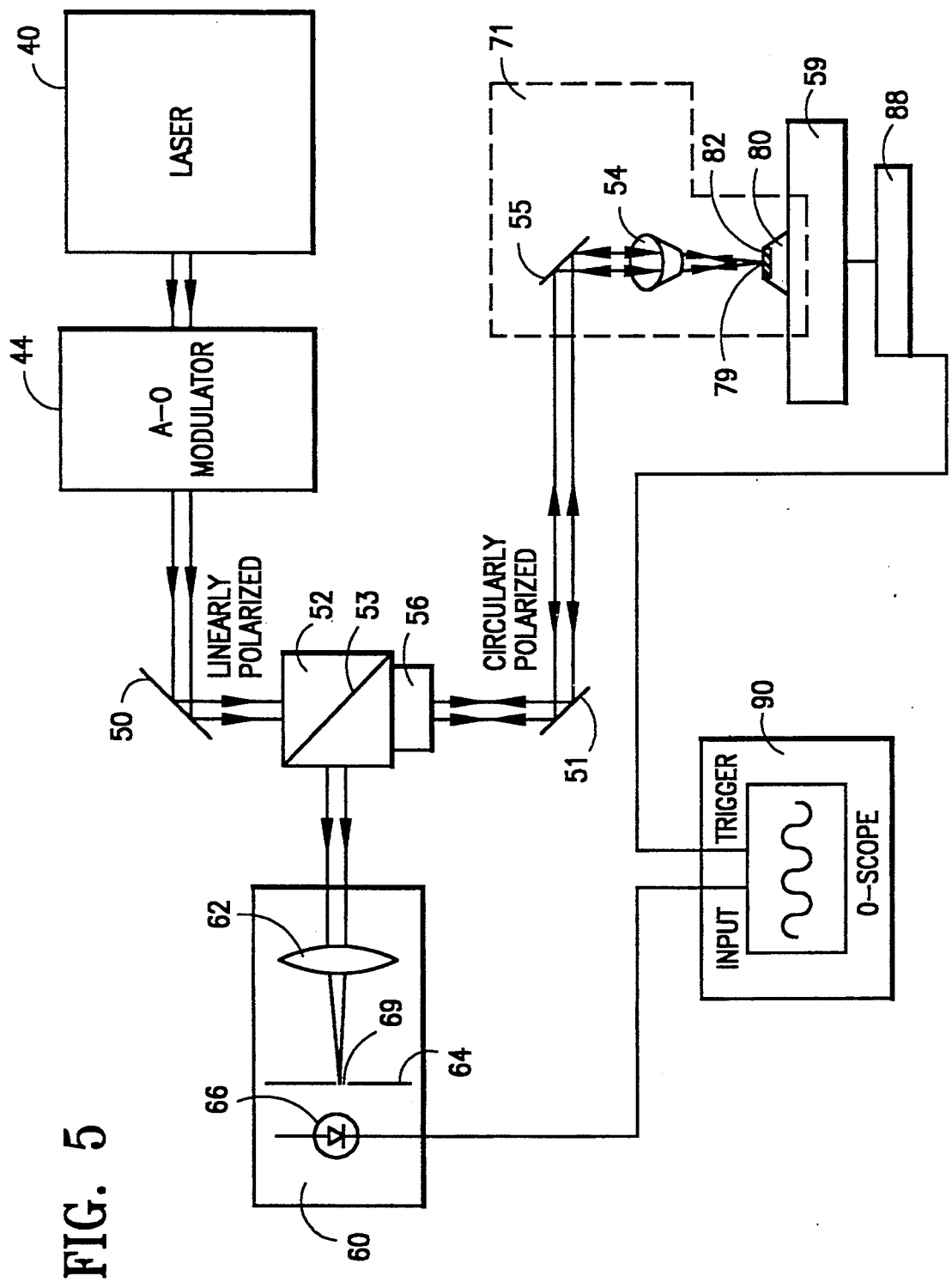
FIG. 5 is a block diagram of the apparatus of FIG. 2 showing modifications to the apparatus for aligning the incident beam.

Referring now to FIG. 5, modifications to apparatus 39 are shown for aligning the incident beam to the center of rotation of the spindle 59. As shown, a shaft encoder 88 is coupled to the spindle 59. The shaft encoder 88 outputs a pulse once for every revolution of the spindle 59. One trace of an oscilloscope 90 is coupled to the output of photodetector 66 for displaying the photodetector output. The oscilloscope 90 is sync/triggered with the output of the shaft encoder 88.

To align the incident beam to the center of rotation of the spindle 59, the centration device 80, and thus the finely ruled surface 82, is mounted on the spindle 59 proximate the center of rotation of the spindle 59, as best shown in FIG. 5. The finely ruled surface 82 is then rotated on the spindle 59. A linearly polarized incident beam of light is generated by the laser 40. The intensity of the beam is set at a level that will not etch the ruled surface 82. The beam passes through modulator 44. Mirror 50 directs the linearly polarized incident beam through the beam separator 52. The beam then passes through the quarter-wave plate 56 which transforms the incident beam from linear to circular polarization. Mirrors 51, 55 then direct the incident beam to the first lens 54 which focuses the incident beam to a point 79 on the rotating surface 82. The optics 55, 54 are initially positioned by the operator at what the operator believes to be the center of rotation of the spindle 59.

A portion of the focused incident beam is reflected. Since the incident beam is focused to a fine point on the rotating surface 82, the reflected light effectively emanates from a point source. Thus, the lens 54 operates to collimate the reflected light and direct a reflected beam back toward the beam separator 52 via the mirrors 51, 55.

As the reflected beam passes back through the quarterwave plate 56 via mirrors 51, 55, the beam separator 52 deflects the reflected beam to the detector means 60. Lens 62 focuses the reflected beam through the pin-hole 69 and onto the photodetector 66 which continuously measures the intensity of the reflected beam. Since the finely ruled surface 82 is constantly rotating, the intensity of the reflection is not steady, but rather oscillates at a frequency that depends on the distance of the beam from the center of rotation of the spindle 59. Thus, the photodetector 66 produces a periodic signal having a frequency indicative of beam position relative to the center of rotation of the spindle.

Figure 6:
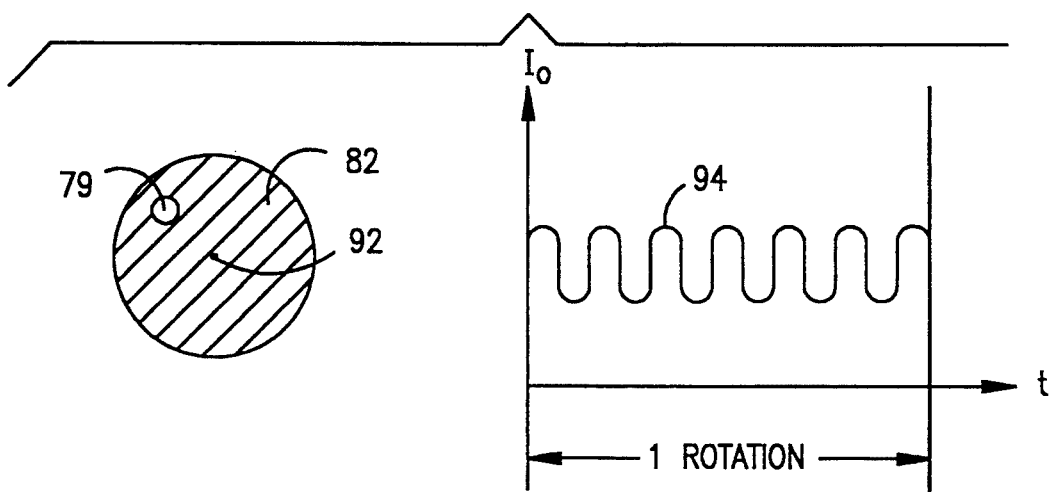
FIGS. 6–8 graphically illustrate the signal output of the oscilloscope of FIG. 5 during a beam alignment sequence.
Figure 7:
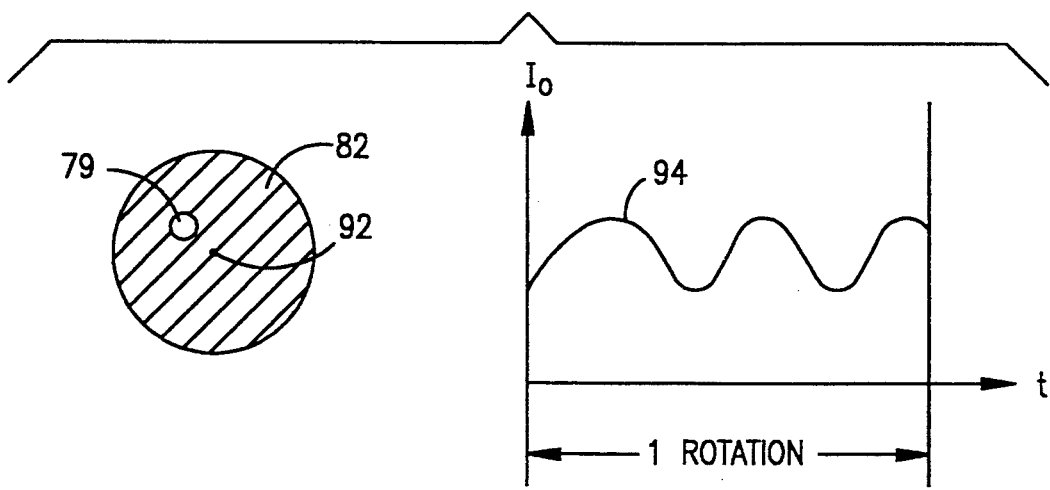
Figure 8:
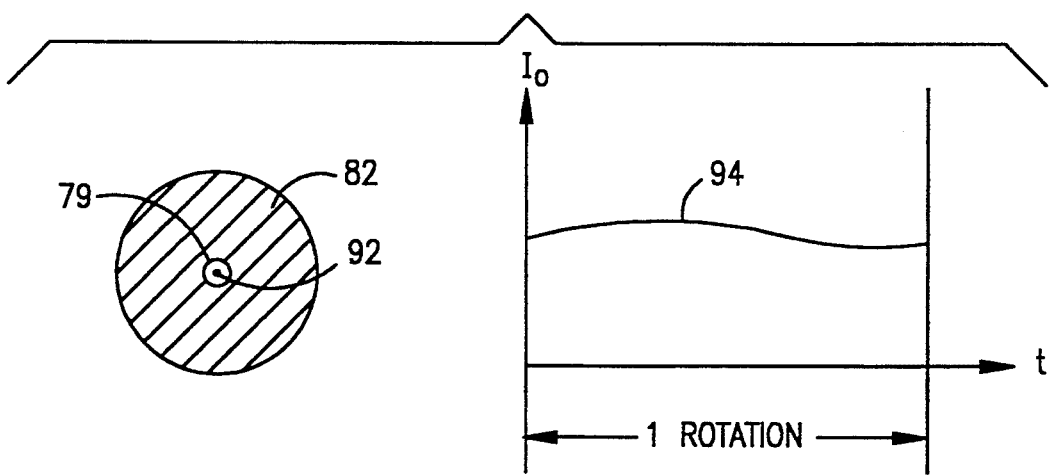

The signal is displayed on the oscilloscope 90. Because the oscilloscope 90 is triggered by the output of the shaft encoder 88, the scope 90 displays the intensity of the reflected beam over a time equal to one revolution of the spindle 59. To obtain maximum centration of the beam, the operator mechanically adjusts the position of the optics 55, 54 parallel to the spindle 59 until the signal indicates maximum centration. Higher frequency oscillations of the displayed signal indicate greater distance of the beam from the center of rotation of the spindle. FIGS. 6 through 8 illustrate a typical beam alignment sequence.

In FIG. 6, the optics (not shown) have been initially positioned such that the incident beam is focused to a spot 79 on the ruled surface 82 at a relatively large distance from the center of rotation 92 of the spindle (not shown). Accordingly, the displayed signal 94 from the photodetector 66 has a high frequency. As illustrated in FIG. 7, as the incident beam is moved closer to the center of rotation 92, the frequency of the displayed signal 94 begins to decrease. FIG. 8 depicts the displayed signal 94 when the incident beam is at maximum centration, i.e., is aligned with the center of rotation of the spindle.

From the foregoing description it can be seen that the present invention comprises an apparatus for and method of etching the surface of a magnetic medium and for verifying that proper etching occurred. More particularly, the present invention is directed to an apparatus for etching a plurality of concentric optical servo tracks about the rotational axis of a magnetic disk having concentric magnetic data tracks wherein each optical servo track comprises a plurality of equally spaced etched stitches, and for verifying the stitch count of each optical servo track. In accordance with another feature of the present invention, the apparatus may additionally be employed to determine the size of the etched spot on the surface of the medium. In accordance with yet another aspect of the present invention, the incident beam is aligned to the center of rotation of the spindle prior to etching the servo tracks. It will be appreciated by those skilled in the art that changes could be made to the embodiment described above without departing from the broad inventive concepts thereof. It is understood, therefore, that this invention is not limited to the particular embodiment disclosed, but is intended to cover all modifications which are within the scope and spirit of the invention as defined by the appended claims.

We claim:

1. An apparatus for etching a point on the surface of a magnetic medium to reduce the reflectivity of said point and for verifying said etching, comprising:

a light source for providing a collimated incident beam of light;

a first lens situated in the path of the transmitted incident beam for focusing the incident beam to a point on the surface of the magnetic medium, the focused incident beam reacting with the magnetic medium to reduce the reflectivity of the surface at that point, a portion of the focused incident beam being reflected, said first lens collimating the reflected beam and directing the reflected beam back toward the light source;

means for separating the reflected beam from the incident beam and for deflecting the reflected beam; and detector means situated in the path of the deflected reflected beam for measuring the intensity of the reflected beam, and for comparing the measured intensity to a threshold value, whereby proper etching is verified if the intensity of the reflected beam is not less than the threshold value.

2. The apparatus of claim 1 wherein the means for separating and for deflecting the reflected beam comprises:

a polarizer positioned in the path of the incident beam between the light source and the first lens for linearly polarizing the incident beam in a first polarizing direction;

a beam separator positioned in the path of the incident beam between the polarizer and the first lens having means for transmitting light linearly polarized in the first polarizing direction and for deflecting light linearly polarized in a direction orthogonal to the first polarizing direction, the beam separator transmitting the incident beam; and means positioned between the first lens and the beam separator for altering the polarization of the reflected beam relative to the incident beam such that the reflected beam is linearly polarized in a direction orthogonal to the direction of polarization of the incident beam thereby causing the beam separator to deflect the reflected beam.

3. The apparatus of claim 1 wherein the magnetic medium is positioned in the focal plane of the first lens.

4. The apparatus of claim 1 wherein the threshold value is adjustable for different types of magnetic media.

5. The apparatus of claim 1 further comprising:

imaging means positioned in the path of the deflected reflected beam for generating from the reflected beam an image of the etched point on the surface of the medium; and means for processing the generated image to determine the size of the etched point; and means for adjusting the focus of the first lens if the size of the etched point exceeds a pre-determined tolerance.

6. The apparatus of claim 2 wherein the means for altering the linear polarization of the reflected beam comprises a quarter wave plate.

7. The apparatus of claim 1 wherein the magnetic medium is a disc having a rotational axis and having concentric magnetic data tracks about said rotational axis, and wherein the disk is positioned substantially in the focal plane of the first lens, and wherein the apparatus further comprises:

means for rotating the disc about the rotational axis thereof;

means for modulating the light source on and off for consecutively etching a plurality of equally spaced stitches about the rotational axis of the medium, said plurality of stitches defining an optical servo track, said detector means for verifying each consecutively etched stitch in the track; and means for moving the incident beam radially of the disc for etching each of a plurality of concentric optical servo tracks about the rotational axis of the disc.

8. The apparatus of claim 7 wherein each optical servo track has a pre-determined stitch count and wherein the apparatus further comprises:

a counter;

means for incrementing the counter each time a stitch is verified; and means for comparing the contents of the counter to the pre-determined stitch count, whereby proper etching of each optical servo track is verified when the contents of the counter equal the pre-determined stitch count.

9. The apparatus of claim 1 wherein the detector means comprises:

a second lens situated in the path of the deflected reflected beam;

an opaque screen positioned substantially in the focal plane of the second lens and having a pin hole substantially at the focal point of the second lens, said screen for blocking out unfocused rays of light emanating from the second lens; and a photodetector positioned on the side of the screen opposite the second lens and proximate the pin hole for producing a signal having a magnitude proportional to the intensity of the deflected reflected beam passing through the pin hole.

10. The apparatus of claim 9 further comprising means for adjustably attenuating the reflected beam for protecting the photodetector from damage due the intensity of the reflected beam during etching and for allowing the same photodetector to be used with various incident beam and reflected beam intensities.

11. An apparatus for etching a point on the surface of a magnetic medium to reduce the reflectivity of said point and for verifying said etching, comprising:

a light source for providing a collimated incident beam of light;

a polarizer situated in the path of the incident beam for linearly polarizing the incident beam in a first polarizing direction;

a beam separator situated in the path of the incident beam having means for transmitting light linearly polarized in the first polarizing direction and for deflecting light linearly polarized in a direction orthogonal to the first polarizing direction, the beam separator transmitting the incident beam;

a first lens situated in the path of the transmitted incident beam for focusing the incident beam to a point on the magnetic medium, the focused incident beam reacting with the magnetic medium to reduce the reflectivity at that point, a portion of the focused incident beam being reflected, said first lens collimating the reflected beam and directing the reflected beam back toward the beam separator;

means for altering the polarization of the reflected beam relative to the incident beam prior to passing back through the beam separator such that the reflected beam is linearly polarized in a direction orthogonal to the first polarizing direction of the incident beam thereby causing the beam separator to deflect the reflected beam; and detector means situated in the path of the deflected reflected beam for measuring the intensity of the reflected beam, and for comparing the measured intensity to a threshold value, whereby proper etching is verified if the intensity of the reflected beam is not less than the threshold value.

12. The apparatus of claim 11 wherein the magnetic medium is positioned in the focal plane of the first lens.

13. The apparatus of claim 11 wherein the means for altering the linear polarization of the reflected beam comprises a quarter wave plate.

14. The apparatus of claim 11 wherein the threshold value is adjustable for different types of magnetic media.

15. The apparatus of claim 11 further comprising:

imaging means positioned in the path of the deflected reflected beam for generating from the reflected beam an image of the etched point on the surface of the medium; and means for processing the generated image to determine the size of the etched point; and means for adjusting the focus of the first lens if the size of the etched point exceeds a pre-determined tolerance.

16. The apparatus of claim 12 wherein the magnetic medium is a disc having a rotational axis and having concentric magnetic data tracks about said rotational axis, and wherein the apparatus further comprises:

means for rotating the disc about the rotational axis thereof;

means for modulating the light source on and off for consecutively etching a plurality of equally spaced stitches about the rotational axis of the medium, said plurality of stitches defining an optical servo track, said detector means for verifying each consecutively etched stitch in the track; and means for moving the incident beam radially of the disc for etching each of a plurality of concentric optical servo tracks about the rotational axis of the disc.

17. The apparatus of claim 16 wherein each optical servo track has a pre-determined stitch count and wherein the apparatus further comprises:

a counter;

means for incrementing the counter each time a stitch is verified; and means for comparing the contents of the counter to the pre-determined stitch count, whereby proper etching of the optical servo track is verified when the contents of the counter equal the pre-determined stitch count.

18. The apparatus of claim 11 wherein the detector means comprises:

a second lens situated in the path of the deflected reflected beam;

an opaque screen positioned substantially in the focal plane of the second lens and having a pin hole substantially at the focal point of the second lens, said screen for blocking out unfocused rays of light emanating from the second lens; and a photodetector positioned on the side of the screen opposite the second lens and proximate the pin hole for producing a signal having a magnitude proportional to the intensity of the focused reflected beam passing through the pin hole.

19. The apparatus of claim 18 further comprising means for adjustably attenuating the reflected beam for protecting the photodetector from damage due the intensity of the reflected beam during etching and for allowing the same photodetector to be used with various incident beam and reflected beam intensities.

20. An apparatus for etching a plurality of concentric optical servo tracks about the rotational axis of a magnetic storage disc having concentric magnetic data tracks about said rotational axis, wherein each optical servo track comprises a plurality of equally spaced etched stitches, and for verifying the stitch count of each track, comprising:

means for rotating the disc about the rotational axis thereof;

a light source for providing a collimated incident beam of light;

means for modulating the light source on and off for consecutively etching the plurality of equally spaced stitches in each optical servo track;

a polarizer situated in the path of the incident beam for linearly polarizing the incident beam in a first polarizing direction;

a beam separator situated in the path of the incident beam having means for transmitting light linearly polarized in the first polarizing direction and for deflecting light linearly polarized in a direction orthogonal to the first polarizing direction, the beam separator transmitting the incident beam;

a first lens situated in the path of the transmitted incident beam for focusing the incident beam to a point on the magnetic disc, the first lens being positioned such that the disc lies substantially in the focal plane of the first lens, the focused incident beam reacting with the rotating magnetic medium to create a stitch on the medium having reduced reflectivity, a portion of the focused incident beam being reflected, said first lens collimating the reflected beam and directing the reflected beam back toward the beam separator;

means for altering the polarization of the reflected beam relative to the incident beam prior to passing back through the beam separator such that the reflected beam is linearly polarized in a direction orthogonal to the first polarizing direction of the incident beam thereby causing the beam separator to deflect the reflected beam;

detector means situated in the path of the deflected reflected beam for measuring the intensity of the reflected beam, and for comparing the measured intensity to a threshold value, and for incrementing a counter when the measured intensity is not less than the threshold value;

means for moving the incident beam radially of the disc for etching each of the plurality of concentric optical servo tracks.

21. The apparatus of claim 20 further comprising:

imaging means positioned in the path of the deflected reflected beam for generating from the reflected beam an image of the etched point on the surface of the medium; and means for processing the generated image to determine the size of the etched point; and means for adjusting the focus of the first lens if the size of the etched point exceeds a pre-determined tolerance.

22. The apparatus of claim 20 wherein each optical servo track has a pre-determined stitch count and wherein the counter is reset prior to etching each servo track and wherein after etching each track the counter is compared to the predetermined stitch count of the track to verify proper etching of the track.

23. The apparatus of claim 20 wherein the counter is reset prior to etching of the magnetic disc and wherein after etching the optical servo tracks on the entire disk, the counter is compared to a pre-determined stitch count for the whole disk.

24. The apparatus of claim 20 wherein the detector means comprises:

a second lens situated in the path of the deflected reflected beam;

an opaque screen positioned substantially in the focal plane of the second lens and having a pin hole substantially at the focal point of the second lens, said screen for blocking out unfocused rays of light emanating from the second lens; and a photodetector positioned on the side of the screen opposite the second lens and proximate the pin hole for producing a signal having a magnitude proportional to the intensity of the focused reflected beam passing through the pin hole.

25. The apparatus of claim 24 further comprising means for adjustably attenuating the reflected beam for protecting the photodetector from damage due the intensity of the reflected beam during etching and for allowing the same photodetector to be used with various incident beam and reflected beam intensities.

26. The apparatus of claim 2, 11 or 20 wherein the means for transmitting light linearly polarized in the first polarizing direction and for deflecting light linearly polarized in a direction orthogonal to the first polarizing direction comprises a multilayer dielectric thin film laser line coating.

27. In an apparatus for etching a plurality of concentric optical servo tracks about the rotational axis of a magnetic storage disc having concentric magnetic data tracks about the rotational axis, wherein each optical servo track comprises a plurality of equally spaced stitches and wherein the stitches are consecutively etched by modulating on and off an incident beam of light focused on said disc by a lens as said disc rotates, and wherein a portion of said incident beam is reflected off the disk during the etching of each stitch, a method for verifying each stitch comprising the steps of:

a) collimating the reflected portion of the incident beam to produce a reflected beam;

b) separating the reflected beam from the incident beam;

c) measuring the intensity of the reflected beam and comparing the measured intensity to a threshold value; and d) providing an indication of verification if the measured intensity is not less than the threshold value.

28. Method of claim 27 wherein step (b) comprises the following steps:

i) linearly polarizing the incident beam in a first polarizing direction prior to focussing said incident beam on said disc;

ii) altering the polarization of the reflected beam relative to the incident beam such that the reflected beam is linearly polarized in a direction orthogonal to the first polarizing direction of the incident beam; and iii) directing the incident beam and the reflected beam through a beam splitter having means for transmitting a beam of light linearly polarized in the first polarizing direction and for deflecting light linearly polarized in a direction orthogonal to the first polarizing direction, whereby the incident beam is transmitted through the beam splitter and the reflected beam is deflected.

29. Method of claim 28 further comprising the steps of:
   i) repeatedly generating from the reflected beam an image of the etched point on the surface of the medium;
   ii) processing the generated image to determine the size of the etched point; and
   iii) adjusting the focus of the lens if the size of the etched point exceeds a pre-determined tolerance.

30. Method of claim 27 wherein each optical servo track has a pre-determined stitch count and wherein the following additional steps are performed for each track:
   a') incrementing a counter each time a stitch is verified; and
   b') comparing the contents of the counter to the pre-determined stitch count, whereby proper etching of the optical servo track is verified when the contents of the counter equal the pre-determined stitch count.

31. Method of claim 27 further comprising the step of adjusting the threshold value according to characteristics of the magnetic disc.

32. Method of claim 27 further comprising the step of adjustably attenuating the reflected beam prior to performing step (c).

33. Method of claim 28 wherein step (b)(ii) is performed by a quarter-wave plate.

34. The method of claim 27 wherein said apparatus for etching further comprises:
   optics for generating said incident beam of light for etching said optical servo tracks; and
   a spindle having a center of rotation for rotating said disk in proximity to said optics, said method further comprising aligning the incident beam to the center of rotation of said spindle prior to etching said servo tracks, including the steps of:
   mounting a finely ruled surface on said spindle proximate the center of rotation of said spindle;
   rotating said finely ruled surface on said spindle;
   focusing said incident beam onto said rotating finely ruled surface, a portion of said incident beam being reflected from said ruled surface and forming a reflected beam;
   continuously measuring the intensity of the reflected beam to produce a periodic signal having a frequency indicative of beam position relative to said center of rotation of said spindle; and
   mechanically adjusting the position of said optics parallel to said spindle until said signal indicates maximum centration.

35. Method of claim 34 further comprising the step of separating the reflected beam from the incident beam prior to measuring the intensity of the reflected beam.

36. Method of claim 34 wherein said finely ruled surface is a Ronchi Ruling.

37. A method of etching a spot on the surface of a magnetic medium to reduce the reflectivity of the spot and of verifying said etching, comprising the steps of:
   a) providing an incident beam of light;
   b) focusing the incident beam to a spot on the magnetic medium, said incident beam reacting with the magnetic medium to reduce the reflectivity of the spot, a portion of the incident beam being reflected by the medium;
   c) collimating the reflected portion of the incident beam to produce a reflected beam;
   d) separating the reflected beam from the incident beam;
   e) measuring the intensity of the reflected beam and comparing the measured intensity to a threshold value; and
   f) providing an indication of verification if the measured intensity is not less than the threshold value.

38. Method of claim 37 wherein step (d) comprises the following steps:
   i) linearly polarizing the incident beam in a first polarizing direction prior to step (b);
   ii) altering the polarization of the reflected beam relative to the incident beam such that the reflected beam is linearly polarized in a direction orthogonal to the first polarizing direction of the incident beam; and
   iii) directing the incident beam and the reflected beam through a beam splitter having means for transmitting a beam of light linearly polarized in the first polarizing direction and for deflecting light linearly polarized in a direction orthogonal to the first polarizing direction, whereby the incident beam is transmitted through the beam splitter and the reflected beam is deflected.

39. Method of claim 37 wherein the incident beam is focused to a spot on the magnetic medium by a lens, and further comprising the steps of:
   i) repeatedly generating from the reflected beam an image of the etched spot on the surface of the medium;
   ii) processing the generated image to determine the size of the etched spot; and
   iii) adjusting the focus of the lens if the size of the etched spot exceeds a pre-determined tolerance.

40. Method of claim 37 wherein the magnetic medium is a disc having a rotational axis and having concentric magnetic data tracks about said rotational axis, said method comprising the following additional steps:
   a') rotating the disc about the rotational axis thereof;
   b') modulating the incident beam on and off for consecutively etching a plurality of equally spaced stitches about the rotational axis of the medium, said plurality of stitches defining an optical servo track, and
   wherein steps (c) through (f) are performed for each stitch.

41. Method of claim 40 wherein the optical servo track has a pre-determined stitch count and wherein the following additional steps are performed:
   a') incrementing a counter each time a stitch is verified; and
   b') comparing the contents of the counter to the pre-determined stitch count, whereby proper etching of the optical servo track is verified when the contents of the counter equal the pre-determined stitch count.

42. Method of claim 37 further comprising the step of adjusting the threshold value according to characteristics of the magnetic medium.

43. Method of claim 37 further comprising the step of adjustably attenuating the reflected beam prior to performing step (e).

44. Method of claim 38 wherein step (d)(ii) is performed by a quarter-wave plate.

* * * * *